United States Patent
Nefcy et al.

(10) Patent No.: US 8,560,153 B2
(45) Date of Patent: Oct. 15, 2013

(54) VEHICLE BATTERY STATE OF CHARGE HOLD FUNCTION AND ENERGY MANAGEMENT

(75) Inventors: Bernard D. Nefcy, Novi, MI (US); Ming Lang Kuang, Canton, MI (US); William Paul Perkins, Dearborn, MI (US); Brandon R. Masterson, Dexter, MI (US); Derek Hartl, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 13/027,563

(22) Filed: Feb. 15, 2011

(65) Prior Publication Data
US 2011/0202223 A1    Aug. 18, 2011

Related U.S. Application Data

(60) Provisional application No. 61/338,201, filed on Feb. 15, 2010.

(51) Int. Cl.
*B60L 9/00*    (2006.01)

(52) U.S. Cl.
USPC ........ 701/22; 701/66; 180/65.265; 180/65.28; 903/903

(58) Field of Classification Search
USPC ............ 701/22, 36, 66; 903/903; 180/65.265, 180/65.28
See application file for complete search history.

(56) References Cited

U.S. PATENT DOCUMENTS

| | | | |
|---|---|---|---|
| 7,539,562 B2 * | 5/2009 | Maguire et al. | 701/22 |
| 2009/0114463 A1 | 5/2009 | DeVault | |
| 2009/0150015 A1 * | 6/2009 | Okubo et al. | 701/22 |
| 2009/0259363 A1 * | 10/2009 | Li et al. | 701/36 |

* cited by examiner

*Primary Examiner* — Gertrude Arthur Jeanglaude
(74) *Attorney, Agent, or Firm* — Brooks Kushman P.C.; David B. Kelley

(57) ABSTRACT

A method and a system for controlling a vehicle is provided. The vehicle has first and second propulsion devices. The vehicle determines a calculated decline in state of charge (SOC) for a charge depleting mode for a battery coupled to the first propulsion device. The vehicle is operated to achieve the calculated decline in SOC. The vehicle operates the second propulsion device for at least a predetermined time after the second propulsion device is turned on during the charge depleting mode.

20 Claims, 4 Drawing Sheets

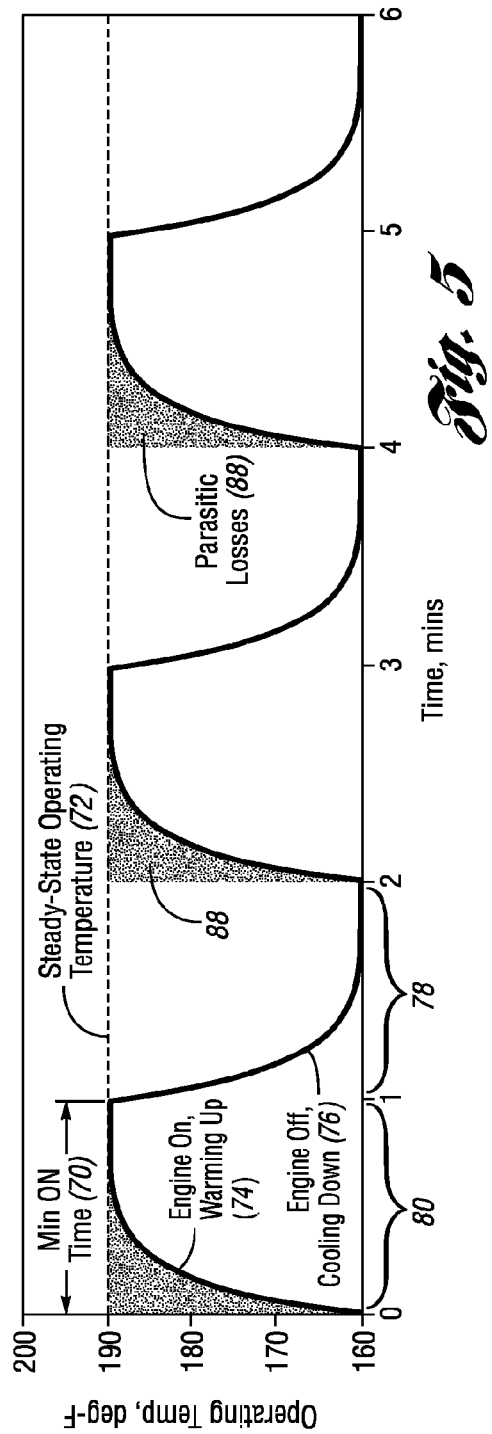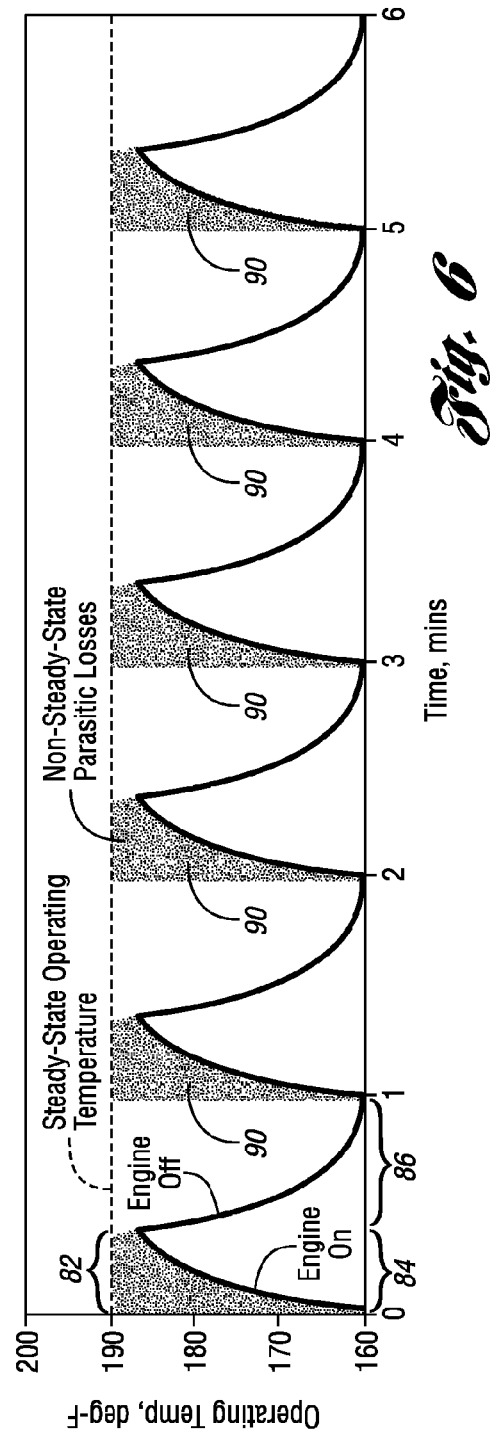

VEHICLE BATTERY STATE OF CHARGE HOLD FUNCTION AND ENERGY MANAGEMENT

CROSS-REFERENCE TO RELATED APPLICATIONS

This application claims the benefit of U.S. provisional application Ser. No. 61/338,201 filed Feb. 15, 2010.

TECHNICAL FIELD

Various embodiments relate to electric energy management in a vehicle.

BACKGROUND

Vehicles may have one or more source of power and managing the power for improved fuel economy, vehicle efficiency, or for various operating modes may be desirable.

SUMMARY

A power management strategy for PHEVs will allocate a driver power demand to the two energy sources to achieve improved fuel economy and other comparable HEVs' control objectives.

In an embodiment, a method to control a vehicle is provided. A decline in state of charge (SOC) is determined for a charge depleting mode for a battery coupled to a first propulsion device. The vehicle is operated to achieve the determined decline in SOC. A second propulsion device is operated for a minimum time after the second propulsion device is turned on during the charge depleting mode.

In another embodiment, a method to control a PHEV having electric motor and engine propulsion devices is provided. A reference state of charge profile of the battery is determined based on a present state of charge (SOC) of a battery coupled to the electric motor. The reference state of charge profile contains a decline period. The reference state of charge profile is tracked in a spatial domain. The electric motor and engine propulsion devices are operated to correspond with the reference state of charge profile. The engine is operated for a minimum time after it is turned on.

In yet another embodiment, a vehicle is provided with first and second propulsion devices, and a battery coupled to the first propulsion device. The first and second propulsion devices are coupled to wheels of the vehicle via a transmission. The vehicle also has an electronic control unit (ECU) electronically coupled to the first and second propulsion devices and the battery. The ECU determines a decline in state of charge (SOC) in a battery coupled to the first propulsion device, and operates the vehicle to achieve the determined decline in SOC. The second propulsion device is operated for a minimum time after it is turned on.

BRIEF DESCRIPTION OF THE DRAWINGS

FIG. 5 is a time plot of operating temperature of the engine during a charge/discharge operating mode wherein parasitic drag during a minimum engine on time is illustrated.

FIG. 6 is a time plot of the same variables seen in FIG. 6 wherein the engine on and off times are shorter than the engine on and off times for the plot of FIG. 5.

DETAILED DESCRIPTION

Figure 1:
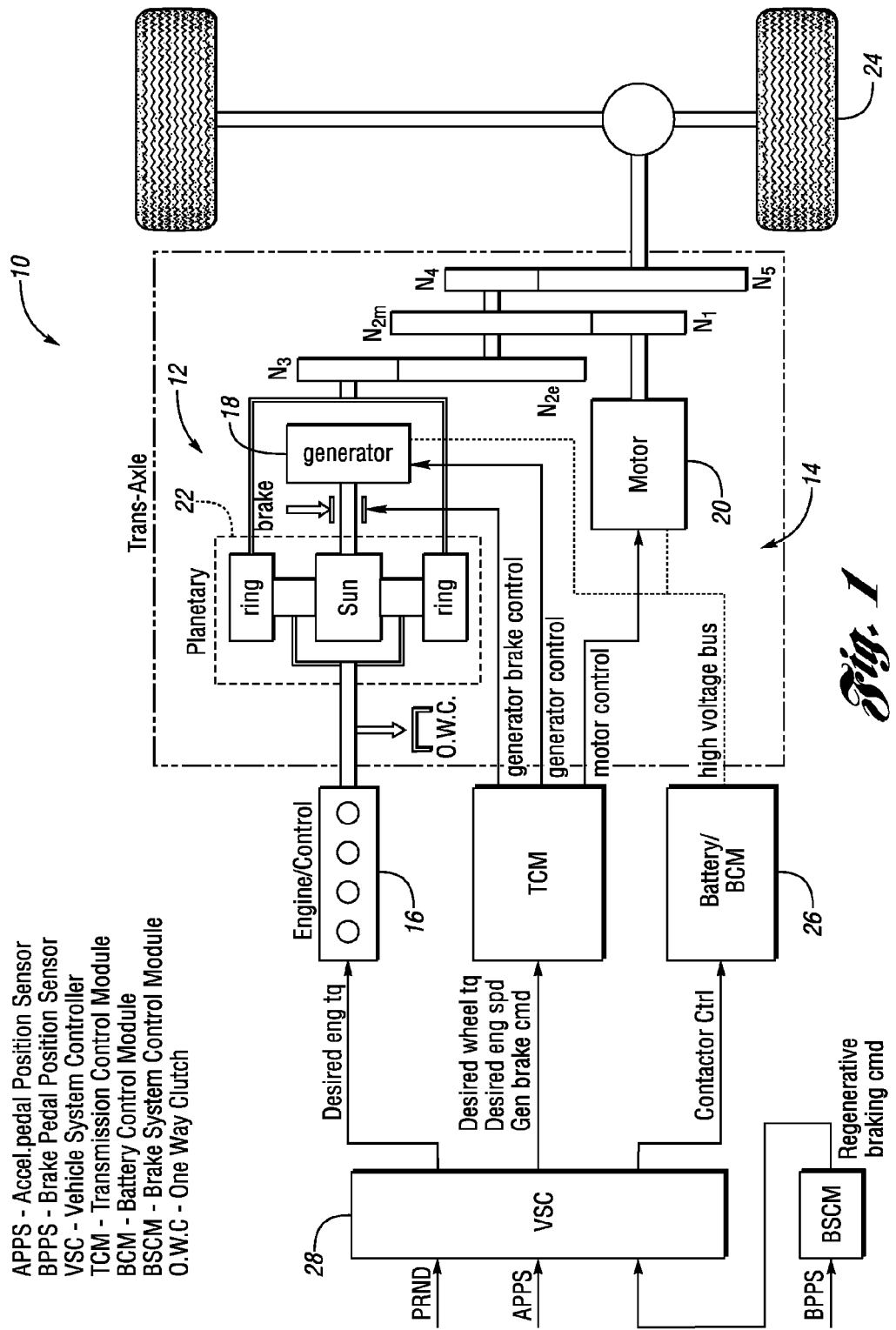
FIG. 1 is a schematic representation of a hybrid electric vehicle powertrain capable of embodying the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles may have two or more propulsion devices, such as a first propulsion device and a second propulsion device. For example, the vehicle may have an engine and an electric motor, a fuel cell and an electric motor, or other combinations of propulsion devices as are known in the art. The engine may be a compression or spark ignition internal combustion engine, or an external combustion engine, and the use of various fuels is contemplated. In one example, the vehicle is a hybrid vehicle (HEV), and additionally may have the ability to connect to an external electric grid, such as in a plug-in electric hybrid vehicle (PHEV). The PHEV structure is used in the figures and to describe the various embodiments below; however, it is contemplated that the various embodiments may be used with vehicles having other propulsion devices or combinations of propulsion devices as is known in the art.

A plug-in Hybrid Electric Vehicle (PHEV) involves an extension of existing Hybrid Electric Vehicle (HEV) technology, in which an internal combustion engine is supplemented by an electric battery pack and at least one electric machine to further gain increased mileage and reduced vehicle emissions. A PHEV uses a larger capacity battery pack than a standard hybrid vehicle, and it adds a capability to recharge the battery from an electric power grid, which supplies energy to an electrical outlet at a charging station. This further improves the overall vehicle system operating efficiency in an electric driving mode and in a hydrocarbon/electric blended driving mode.

Conventional HEVs buffer fuel energy and recover kinematic energy in electric form to achieve the overall vehicle system operating efficiency. Hydrocarbon fuel is the principal energy source. For PHEVs, however, there is one additional source of energy—the amount of electric energy stored in the battery from the grid after each battery charge event.

While most conventional HEVs are operated to maintain the battery state of charge (SOC) around a constant level, PHEVs use as much pre-saved battery electric (grid) energy as possible before the next battery charge event; i.e. the relatively low cost grid supplied electric energy is expected to be fully utilized for propulsion and other vehicle functions after each charge. After the battery SOC decreases to a low conservative level, the PHEV will resume operation as a conventional HEV in a so-called charge sustaining mode until the battery is re-charged.

Figure 3:
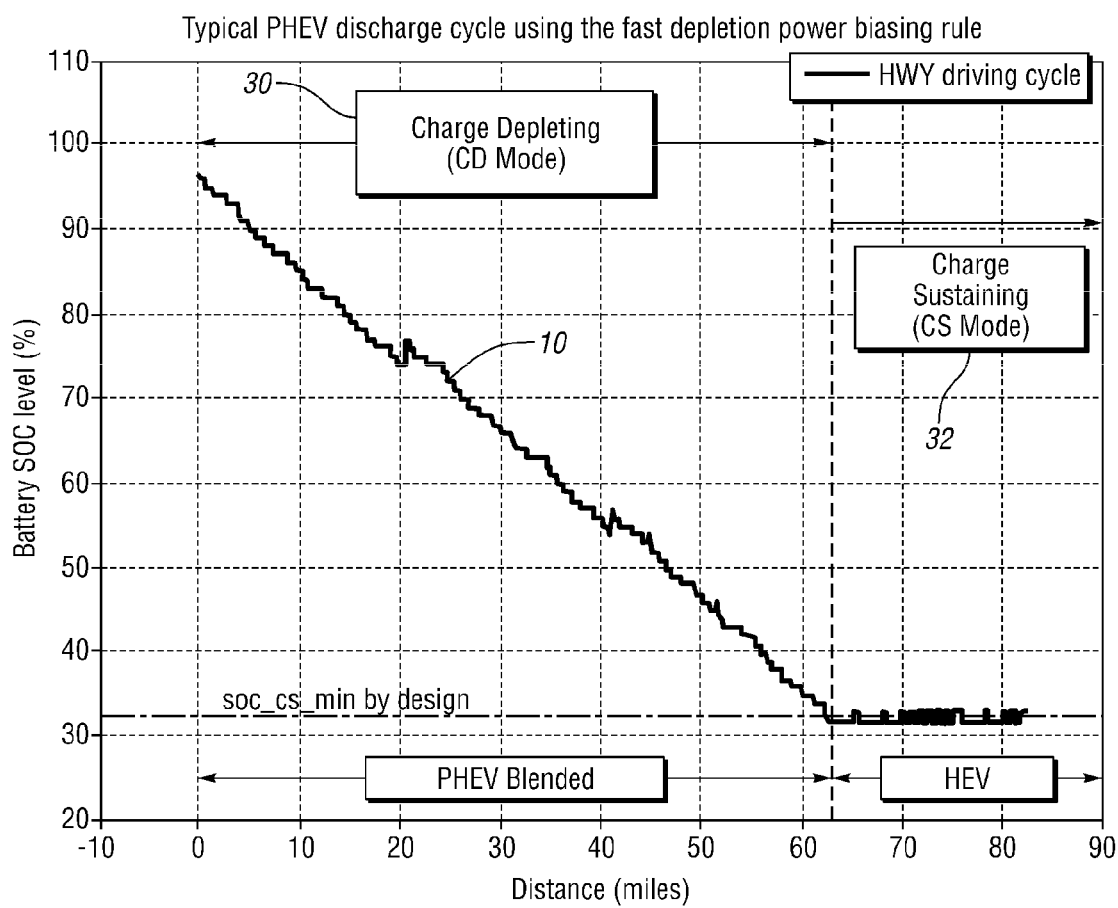
FIG. 3 is a plot of a typical PHEV discharge cycle for a charge depletion strategy.

FIG. 3 shows the two basic operation modes of a typical PHEV 10: charge depleting (CD) mode 30 and charge sustaining (CS) mode 32. During a first travel distance after a charge, the fully/partially charged PHEV 10 is driven in CD mode, where primarily the battery electric energy is used to propel the vehicle, gradually depleting the battery's electric energy. Once the battery SOC decreases to a predefined charge sustaining SOC level, the vehicle switches to CS mode, where the battery SOC is kept within a certain range around the charge sustaining SOC level. The vehicle is mainly powered, for example, by a gasoline engine (fuel energy), as is done in a conventional HEV. The CD range is defined as the distance a fully charged PHEV can travel in CD mode before the energy utilization pattern switches to the CS mode. By primarily using the battery electric energy to propel the vehicle, the PHEV fuel consumption will be minimized (blended CD mode) or even with no gasoline fuel cost at all (all-electric CD mode), especially when the trip distance is less than or close to the CD range (approximately thirty to sixty miles for a typical design in multiple driving cycles). This control strategy is called base PHEV charge depletion (CD) strategy.

Figure 2:
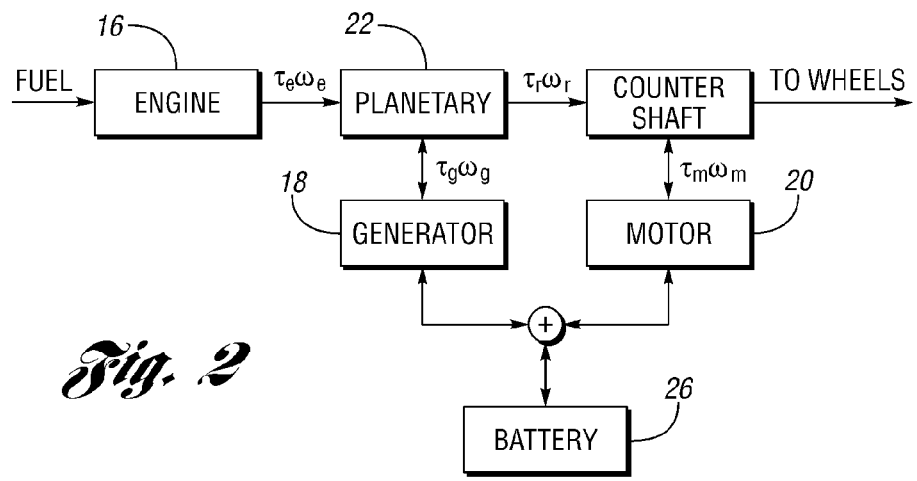
FIG. 2 is a diagram of the power flow paths for the components of the powertrain shown in FIG. 1 during operation in a charge sustaining mode.

A power split hybrid electric vehicle (HEV) 10 is a parallel hybrid electric vehicle. FIG. 1 shows a power split HEV 10 powertrain configuration and control system. In this powertrain configuration, there are two power sources 12, 14 that are connected to the driveline: 12) a combination of engine and generator subsystems using a planetary gear set to connect to each other, and 14) the electric drive system (motor, generator, and battery subsystems). The battery subsystem is an energy storage system for the generator and the motor. FIG. 2 shows the possible power flow paths in this powertrain configuration when the powertrain is operating in a charge sustaining mode.

In the first power source, as shown in FIG. 2, the engine output power can be split into two paths by controlling a generator-mechanical path $t_r\omega_r$ (from the engine 16 to the carrier to the ring gear to counter shaft), and an electrical path $\tau_g\omega_g$ to $\tau_m\omega_m$ (from the engine 16 to the generator 18 to the motor 20 to the counter shaft).

The changing generator speed will vary the engine output power split between an electrical path and a mechanical path. In addition, the control of engine speed results in a generator torque to react against the engine output torque. It is this generator reaction torque that conveys the engine output torque to the ring gear of the planetary gear set 22, and eventually to the wheels 24. This mode of operation is called "positive split". It is noted that because of the kinematic properties of the planetary gear set 22, the generator 18 can possibly rotate in the same direction of its torque that reacts against the engine output torque. In this instance, the generator 18 inputs power (like the engine) to the planetary gear set to drive the vehicle 10. This operation mode is called "negative split".

As in the case of the positive split mode, the generator torque resulting from the generator speed control during a negative split reacts to the engine output torque and conveys the engine output torque to the wheels 24. This combination of the generator 18, the motor 20 and the planetary gear set 22 is analogous to an electro-mechanical CVT. When the generator brake (shown in FIG. 1) is actuated (parallel mode operation), the sun gear is locked from rotating and the generator braking torque provides reaction torque to the engine output torque. In this mode of operation, all the engine output power is transmitted, with a fixed gear ratio, to the drivetrain through the mechanical path.

In a vehicle 10 with a power split powertrain system, unlike conventional vehicles, the engine 16 requires either the generator torque resulting from engine speed control or the generator brake torque to transmit its output power through both the electrical and mechanical paths (split modes) or through the all-mechanical path (parallel mode) to the drivetrain for forward motion.

During operation using the second power source 14, the electric motor 20 draws power from the battery 26 and provides propulsion independently of the engine 16 for forward and reverse motions. This operating mode is called "electric drive". In addition, the generator 18 can draw power from the battery 26 and drive against a one-way clutch coupling on the engine output shaft to propel the vehicle 10 forward. The generator 18 alone can propel the vehicle 10 forward when necessary. This mode of operation is called generator drive mode.

The operation of this power split powertrain system, unlike conventional powertrain systems, integrates the two power sources 12, 14 to work together seamlessly to meet the driver's demand without exceeding the system's limits (such as battery limits) while optimizing the total powertrain system efficiency and performance. Coordination control between the two power sources is needed. As shown in FIG. 1, there is a hierarchical vehicle system controller (VSC) 28 that performs the coordination control in this power split powertrain system. Under normal powertrain conditions (no subsystems/components faulted), the VSC interprets the driver's demands (e.g. PRND and acceleration or deceleration demand), and then determines the wheel torque command based on the driver demand and powertrain limits. In addition, the VSC 28 determines when and how much torque each power source needs to provide in order to meet the driver's torque demand and to achieve the operating point (torque and speed) of the engine.

During the charge depletion mode (CD) of a plug-in hybrid electric vehicle (PHEV), a conventional trajectory of state-of-charge (SOC) versus time or distance is not controlled, or is controlled for a fixed optimal distance, such as 20 miles, such as is shown in FIG. 3. Using the strategy of FIG. 3, for example, during a conventional trajectory, the powertrain will consume as much electrical energy as possible during the CD mode 30 regardless of the overall vehicle efficiency and then enter a CS mode 32. This method will produce the best available fuel economy, but it may not match a customer's expectation of real world fuel economy. The method illustrated in FIG. 3 is good for a driver who plugs in his vehicle battery at the end of each day and drives distances shorter than the electrical capacity of the battery.

On the other hand, if the driver undergoes a travel event beyond the usual fixed optimal distance, the strategy of the present invention will have a more optimal energy management strategy, wherein control of the trajectory of a plot of battery charge versus time or distance is based on driver behavior. A possible implementation could use minimum engine on time and power output to modify the slope of the SOC descent in a SOC versus time (or distance) plot during the CD mode. The engine may have to be turned on to provide power due to demand during the CD mode.

The engine on time is computed based on various inputs, and this minimum on time is used if all other reasons, including driver demand for power, to continue to run the engine are removed. For example, the requirement for the engine to provide power to accessories could be removed.

Figure 4:
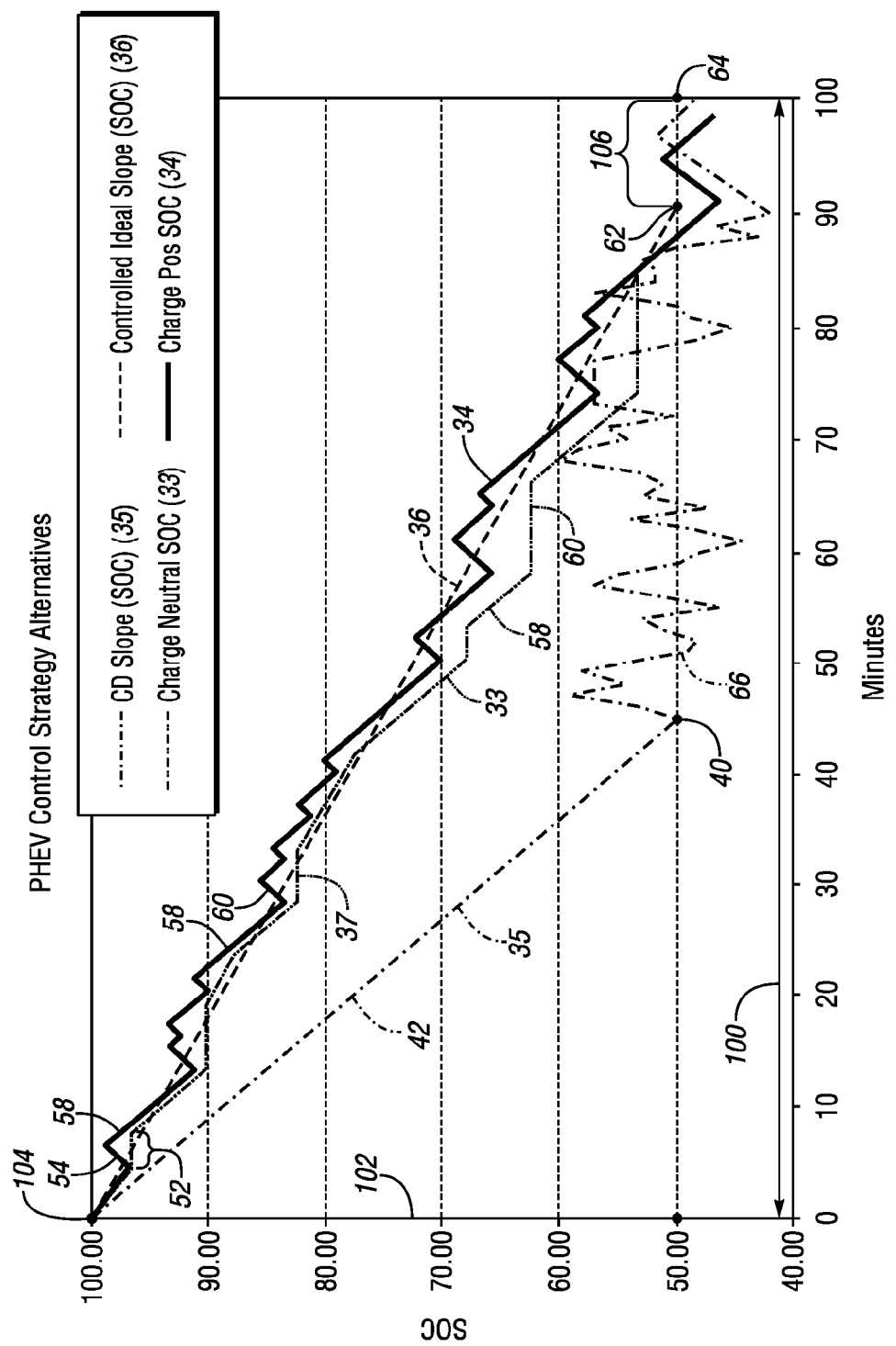
FIG. 4 is a time plot of PHEV control strategies of an embodiment of the invention.

As illustrated in FIG. 4, the system could operate in a manner that maximizes battery discharge shown by line 35, which corresponds to the traditional approach as shown in FIG. 3. In this scenario, the engine may turn on frequently whenever driver demand exceeds the maximum output of the battery and the electric motor. During these events, the engine is not operated to reduce output from the battery, but rather operated to supply only the additional amount of driver-demanded output power. The engine turns on frequently but may not reach ideal operating temperatures, and may run inefficiently. The continuous discharge operation continues until the SOC reaches a sustaining level at 40, at which point a charge sustaining mode 66 is used.

Alternatively, in embodiments of the present invention, during such events, the system operates the engine in a charge neutral 33 or charge positive 34 manner. Charge neutral 33 is defined as the SOC that results in an engine power that is the same as a driver demand for power. In other words, charge neutral operation results in a constant SOC for the battery for the length of time the engine is operated, which is shown as a hold or constant level 37 in the SOC in FIG. 4. Charge positive operation 34 results in an increased SOC (as charging of the battery) for the length of time that the engine is operated, which is shown as the increases in SOC 54 on FIG. 4. Both charge neutral operation 33 and charge positive operation 34 effectively change the slope of the descent of the SOC during operation and in the charge depletion mode by operating the engine longer than minimally needed and/or increasing its output beyond what is minimally needed, thereby using the additional engine power output to alter or increase battery SOC. The system efficiency may improve when operating the engine in this manner because (1) letting the engine operate for a longer time frame allows it to reach a more efficient operating temperature, and (2) operating the engine at higher power output allows it to run at a better BSFC (brake-specific fuel consumption).

The base CD-CS mode 35 is shown in FIG. 4 with an initial charge depletion 42 followed by charge sustaining 66, which is similar to the discharge cycle shown in FIG. 3. In this mode of operation, the engine is started frequently, but its output is only enough to meet the portion of driver demand that exceeds the electric motor's capability, thereby resulting in the continuous battery discharge 35 shown.

The target controlled discharge line 36, also shown in FIG. 4, has a discharge target with a slope based on driver behavior, trip length, or the like. Note that the charge neutral 33 and the charge positive 34 discharges follow the target controlled trajectory 36.

The control trajectory 36 for the SOC uses minimum engine on time and output computation as a function of plug-in frequency, as a function of learned distance driven between charges, as a function of user entry of a distance traveled for each trip, as a function of driver aggressiveness, as a function of learned distance driven per day for a given day of the week, as a function of navigation/user route computation, as a function of ratio of SOC to total SOC in the CD mode, or SOC in a charge sustaining mode, and as a function of parasitic losses (offset losses by operating components longer at proper temperature).

In order to improve the overall operating efficiency of the powertrain throughout an extended distance, the engine is turned on at periodic intervals throughout the charge depletion, as illustrated by lines 33 and 34 in FIG. 4. When the engine is turned on for a time interval 52, the charge descent is a controlled descent and the SOC increases at 54 to charge the battery until the SOC reaches a point that may be above the controlled descent slope 36 shown in dotted lines in FIG. 4. The engine on time interval 52 is for a minimum time or longer depending on the driver demand, accessory loads, etc. Afterwards, the engine is turned off and battery power only is used at 58 until the SOC again falls below the controlled descent slope line 36. At that point, the engine is turned on again at 60 thereby recharging the battery so that the SOC again increases to a value above the controlled descent slope 36. This pattern is repeated until the distance traveled is at or is near a destination, or is at or near a charging station 62 at which point the vehicle is stopped, recharged, or continues to operate in a charge sustaining mode 64.

FIG. 4 shows a charge neutral SOC descent 33. The charge neutral 33 strategy attempts to maintain the SOC at or slightly below the ideal slope 36 shown in a dotted line in FIG. 4. The engine operates for at least a minimum engine on time to maintain a battery SOC level 37 to cause the SOC discharge 33 to follow the ideal slope 36. In an alternative strategy, the charge positive strategy 34 keeps the engine on a sufficiently long time to cause the SOC to increase to a value above the value corresponding to the ideal slope 36. The peak values for line 34 in FIG. 4 represent the points when the engine is turned off, at which point the negative slope portions of the plots represent electric only operation. The portions of line 34 shown in FIG. 4 that have a positive upward slope represent the instances when the engine is turned on to provide additional power for battery charging. During these periods, the engine can be operated at a better BSFC.

FIG. 5 is a plot that illustrates the effect of parasitic drag as a function of engine operating temperature or varying engine on and off times. In the case of FIG. 5, the minimum engine on time 70 (or predetermined time) is sufficiently long to allow the engine to warm up 74 and the temperature to reach a steady-state operating temperature 72. When the engine is off, the operating temperature will decrease by cooling down 76 over a period of cool down time 78 that generally corresponds to the period of time 80 required for engine warm up. In the case of FIG. 6, the engine on time 82 is substantially shorter than the engine on time 70 shown in FIG. 6. The engine warm up 84 occurs during a shortened operating temperature range compared to the operating temperature range of FIG. 5. The engine then is turned off so that the engine off time 86 is less than the corresponding engine off time 78 shown in FIG. 5. The control of the engine to produce the characteristics shown in FIG. 6 results in more frequent engine on and off cycles than in FIG. 5 over the same length of time as the engine power is used for propulsion.

Since the engine on and off times are shorter, or at a higher frequency, in FIG. 6, the engine is required to heat up to at or near operating temperatures each time it is restarted. The result of this is more frequent operation at a non-steady state temperature, thereby increasing overall parasitic drag and reducing fuel economy. This is evident by comparing the parasitic drag 88 of FIG. 5 and the parasitic drag 90 of FIG. 6. A minimum engine on time 70 as seen in FIG. 5 is useful for providing improved overall efficiency. The energy produced that exceeds the duration of higher demand that initially caused the engine to turn on can be used to increase battery SOC through battery charging.

Further, operating the engine at a higher output, as shown in FIG. 5, may heat it up faster, and may allow the engine to reach a better BSFC operating point, which means the fuel consumption per unit output is reduced, thereby improving efficiency. The additional engine output can be used to offset battery discharge energy or even charge the battery, as seen in the charge neutral and charge positive operating strategies in FIG. 4.

Referring back to FIG. 4, a typical uncontrolled descent in a base charge depletion mode 35 wherein the charge depletion mode 42 may include engine operation to satisfy a temporary driver demand for torque using an engine on time which meets the driver demand over the maximum available through the battery powered motor. After the engine on time ends, the battery provides the output to meet the driver demand and the usual charge depletion uncontrolled slope event 35 continues until the charge sustaining mode 40 is initiated. A distance 100 between the beginning of the trip and the end of the trip is shown. If the trip distance 100 is sufficiently long, the vehicle operates in the CD mode and then in the CD mode for a significant portion of the trip.

Using an embodiment of the present invention, the SOC increases based on a charge event 102. The charge event 102 recharges the battery using, for example, an external power source such as the electrical grid. Of course, the vehicle may be operated without receiving a full charge during a charging event 102, i.e. when there is insufficient time to recharge the battery before using the vehicle or when charging is not available. The controller calculates a calculated discharge slope 36 based on the available SOC of the battery 104, and a trip length 100. The trip length 100 may be calculated based on a driver input, driving habits or patterns, navigational information from a global positioning system, or the like. In some embodiments, the calculated slope 36 is controlled to end shortly before the end of the trip 100 to ensure that the charge sustaining level 62 is reached, thereby providing a buffer zone 106 before the end of the trip. The vehicle operates using a controlled SOC descent, which may be a charge neutral 33 or charge positive 34, and discharges the battery to the desired level at 62. The calculated SOC descent 33, 34 takes place where the calculated slope 36 is used to control SOC descent.

The controlled descents 33, 34 trend along the calculated trajectory 36 based on time or distance and driver behavior. For example, operating the engine for at least the minimum engine on time 52 (or 70 from FIG. 5) is used to modify the slope of the SOC decent 33, 34 during the CD mode. The engine may have to turn on to provide power due to driver demand during the CD mode based on the driving conditions, or the like. The minimum engine on-time 52 is computed based on various inputs and is used if other reasons to continue to run the engine beyond this minimum time are removed. Other reasons to continue to operate the engine include continued driver demand past the minimum time, the use of vehicle accessories, such as HVAC, etc. The system may operate as charge neutral 33 or charge positive 34 during this condition. Operating the engine for at least the minimum time effectively changes the overall slope (of the SOC decent during CD mode making the discharge less steep to correspond with the calculated slope for SOC descent 36.

Various inputs are used to control the trajectory 36 of SOC using the minimum engine on-time including as a function of plug-in frequency, as a function of a learned distance driven in between charges, as a function of user entry (distance traveled per trip), as a function of driver aggressiveness, as a function of a learned distance driven per day (or day of week), as a function of navigation/user route computation, as a function of ratio of SOC to total SOC in CD mode/SOC in Charge Sustaining (CS) mode, and as a function of parasitic losses (offset losses by operating components longer at proper temperature).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method to control a vehicle comprising:
    determining a decline in state of charge (SOC) for a charge depleting mode of a battery coupled to a first propulsion device;
    operating at least the first propulsion device to achieve the determined decline in SOC; and
    operating a second propulsion device for at least a predetermined time after the second propulsion device is turned on during the charge depleting mode.

2. The method of claim 1 wherein the second propulsion device is operated to assist the first propulsion device and provide power to the vehicle, thereby controlling an actual decline in SOC to correspond with the determined decline in SOC of the battery.

3. The method of claim 1 wherein the determined decline in SOC is determined using a desired trip length such that the vehicle operates in the charge depleting mode for a majority of the desired trip length.

4. The method of claim 1 wherein the second propulsion device is an engine and operates at a steady state operating temperature for a portion of the predetermined time for operation of the engine.

5. The method of claim 1 further comprising turning the second propulsion device off for the same length of time as the predetermined time for operation during the charge depleting mode.

6. The method of claim 1 further comprising operating the second propulsion device longer than the predetermined time to meet a vehicle power demand.

7. The method of claim 1 further comprising determining a present SOC of the battery wherein the determined decline in SOC is based on the present SOC.

8. The method of claim 7 further comprising determining a minimum SOC at which the vehicle operates in a charge-sustaining mode.

9. The method of claim 8 wherein the determined decline in state of charge (SOC) extends from the present SOC down to the minimum SOC.

10. The method of claim 1 wherein the vehicle has an electric power receptacle coupled to the vehicle for charging the battery from an external power source.

11. The method of claim 1 wherein the predetermined time for operation of the second propulsion device is determined using a plug-in frequency for the vehicle.

12. The method of claim 1 wherein the predetermined time for operation of the second propulsion device is determined using a history of distance driven in between charging the battery.

13. The method of claim 1 wherein the predetermined time for operation of the second propulsion device is determined using a learned distance driven in a given time.

14. The method of claim 1 wherein the predetermined time for operation of the second propulsion device is determined using a navigation route computation.

15. A method to control a PHEV having an electric motor and an engine, comprising, in response to determining a reference state of charge profile containing a decline period based on a present state of charge (SOC) of a battery coupled to the electric machine,
    operating the electric motor and the engine to correspond with the reference state of charge profile in a spatial domain, wherein the engine is operated for at least a predetermined time after the engine is turned on.

16. The method of claim 15 wherein the engine is operated in a charge neutral strategy such that engine provides sufficient power to preserve the SOC at a constant level for the predetermined time for operation.

17. The method of claim 15 wherein the engine is operated in a charge positive strategy such that the engine provides sufficient power to increase the SOC during the predetermined time of operation.

18. The method of claim 15 wherein a minimum time for operation of the engine includes operating the engine at a steady state operating temperature for a portion of the predetermined time.

19. The method of claim 18 wherein after operation of the engine, the engine is turned off for approximately the same length of time as the predetermined time for operation.

20. A vehicle comprising:
a first propulsion device;
a battery coupled to the first propulsion device;
a second propulsion device wherein the first and second propulsion devices are coupled to wheels of the vehicle via a transmission; and
an electronic control unit (ECU) electronically coupled to the first propulsion device, the battery, and the second propulsion device, wherein the ECU is configured to determine a reference decline in state of charge (SOC) for the battery; operate at least the first propulsion device to achieve the reference decline in SOC; and operate the second propulsion device for a predetermined time after the second propulsion device is turned on.

* * * * *